UNITED STATES PATENT OFFICE.

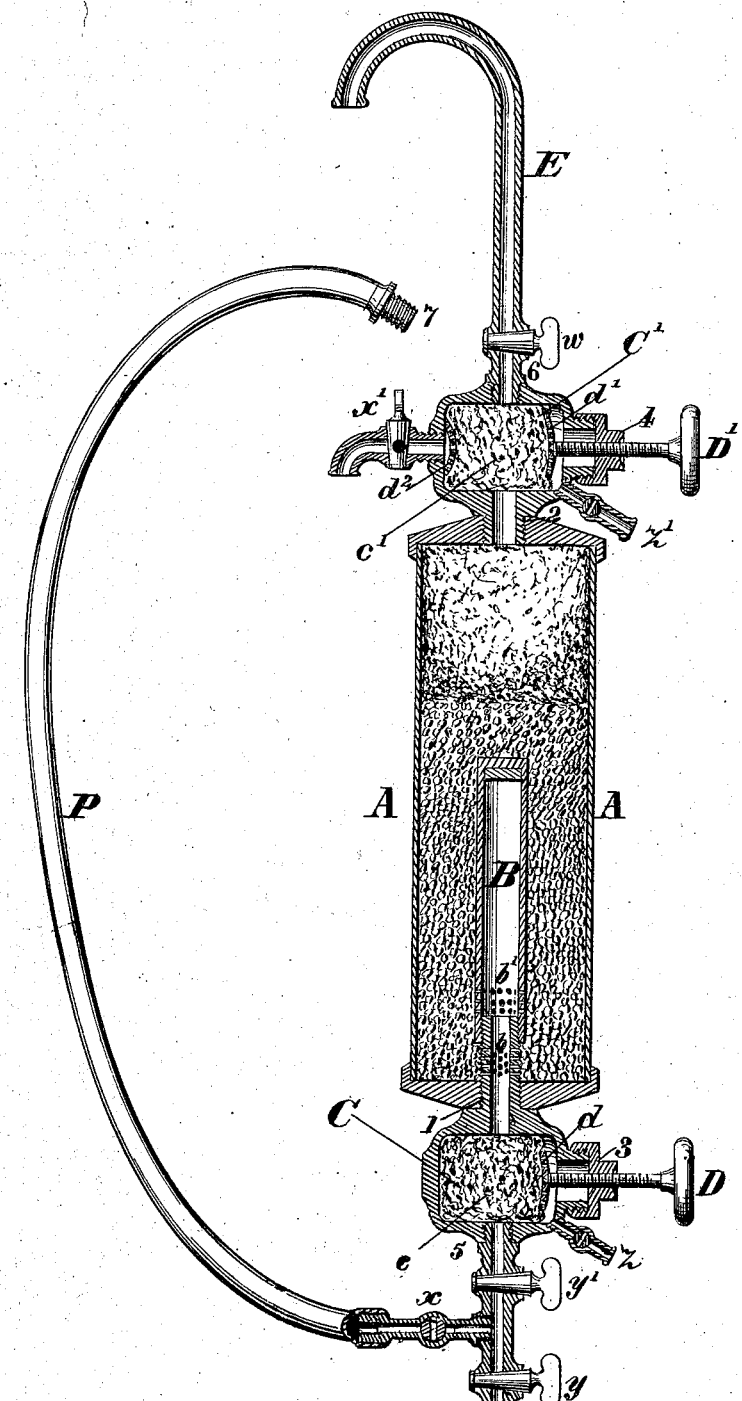

JOHN G. FULGHUM, OF NASHVILLE, TENNESSEE.

IMPROVEMENT IN FILTERS.

Specification forming part of Letters Patent No. 154,660, dated September 1, 1874; application filed May 26, 1874.

*To all whom it may concern:*

Be it known that I, JOHN G. FULGHUM, of Nashville, in the county of Davidson and State of Tennessee, have invented an Improved Filter, of which the following is a specification:

My invention relates to a filter having means for purifying the same, which can be attached by suitable connections to an ordinary supply-pipe communicating with a hydrant, cistern, or other water supply.

My invention consists, first, in a cylinder for containing the usual packing of gravel, sand, and charcoal, having an air-chamber for steadying the flow of water as it enters into said cylinder. My invention consists, secondly, in supplemental cylinders, having chambers for containing sponge. My invention consists, thirdly, in screws having followers operating within the supplemental cylinders for alternately squeezing and releasing the sponge within them, to cleanse the same. My invention consists, fourthly, in attaching a flexible tube to the supply-pipe of the filter, by suitable couplings, to act to cause a reverse current to pass through the filtering mediums when desired.

The accompanying drawing represents a vertical longitudinal section of my improved filter, with the purifier attached to the supply-pipe.

A represents the main cylinder; B, the air-chamber, having perforations $b\ b'$, for the escape of the water. Around this air-chamber B I place gravel or sand, and above it charcoal. C C' are supplemental cylinders, attached, respectively, at the lower and upper ends of the main cylinder, by couplings 1 2. These cylinders C C' have chambers $c\ c'$, into which I place sponge, and at their rear ends caps 3 4. Through these caps I insert screws D D', having followers $d\ d'$, which can be perforated for alternately squeezing and releasing the sponge by simply turning the same. Below the caps 3 4 I insert cocks $z\ z'$, for drawing off the water after pressing the sponge. S is a pipe, communicating with the water-supply, having faucets $y\ y'$, and attached to the lower side of the supplemental cylinder C by a coupling, 5. Between the faucets $y\ y'$ in the supply-pipe S I insert a cock, $x$, to the end 6 of which is attached a tube, P, of rubber or analogous material. E is the discharge-pipe of the filter, having a faucet, $w$, and coupling 6, with which it is attached to the upper side of the supplemental cylinder C'. $x'$ is a cock, inserted in the front end of this cylinder, through which the water can be drawn, and is guarded at its inner end by a strainer, $d^2$. The tube P is used for conducting the water directly from the supply-pipe S to the upper end of the filter, for the purpose of cleansing the filtering mediums by reversing the flow of the current of water. To receive the tube P, the pipe E $w$ 6 is removed, and the coupling 7 of the tube P is inserted into the cylinder C', the cock $y'$ and faucet $x'$ being closed. The cocks $y\ x$ $z'\ z$ are then opened, suitable vessels having been provided for the reception of the impure water. While the purifier is being used the screws D D' are operated, so as to squeeze the sponge again and again.

The purifier can be attached directly onto the main cylinder A by detaching the upper cylinder C'.

It will be seen that the thorough manner in which I cleanse the filter will dispense with the necessity of taking the filter apart except when new filtering material is required, though I construct the whole apparatus so that it can be easily taken apart and put together again when necessary.

The air-chamber B is formed by a vertical tube closed at the upper end, and suitably attached at the lower end to the coupling 1 of the cylinder C. This air-chamber receives the main pressure of the water as it enters the cylinder A, and regulates the flow of the water as it passes through it.

The apparatus, taken as a whole, will be found to successfully filter the most impure water, and is also simple, and cheaply manufactured.

I do not limit myself to the precise form shown, as modifications in form and design will suggest themselves to the mechanic.

The following is claimed as new:

1. The main cylinder A, having the air-chamber B, substantially as described, for the purpose set forth.

2. The supplemental cylinders C C', having chambers $c\ c'$, in combination with the main cylinder A, substantially as and for the purpose set forth.

3. The combination of the external supplemental cylinders $C\ C'$, the supplemental discharge-cocks $z\ z'$, and the squeezing-screws $D\ D'$, having followers $d\ d'$, for the purpose specified.

4. The detachable flexible tube P, having coupling 7, for application to the socket of the discharge-pipe, for purifying the apparatus in the manner set forth.

In testimony of which invention I hereunto set my hand this 14th day of May, 1874.

J. G. FULGHUM.

Witnesses:
M. E. W. DUNAWAY,
JOHN W. PEACOCK.